United States Patent
Huber et al.

(10) Patent No.: US 6,863,636 B2
(45) Date of Patent: Mar. 8, 2005

(54) PINION CARRIER FOR PLANETARY GEAR TRAIN AND METHOD OF MAKING SAME

(75) Inventors: David P. Huber, Millbury, OH (US); Timothy J. Cripsey, Rochester, MI (US)

(73) Assignee: Metal Forming & Coining Corporation, Maumee, OH (US)

( * ) Notice: Subject to any disclaimer, the term of this patent is extended or adjusted under 35 U.S.C. 154(b) by 0 days.

(21) Appl. No.: 10/684,311

(22) Filed: Oct. 10, 2003

(65) Prior Publication Data

US 2004/0077455 A1 Apr. 22, 2004

Related U.S. Application Data

(63) Continuation of application No. PCT/US03/03921, filed on Feb. 10, 2003.
(60) Provisional application No. 60/362,106, filed on Mar. 5, 2002.

(51) Int. Cl.$^7$ .................. F16H 57/08; B21D 53/28; B21K 1/30; B23P 15/14
(52) U.S. Cl. .................................. 475/331; 29/893
(58) Field of Search ................... 475/331, 344, 475/901; 29/893

(56) References Cited

U.S. PATENT DOCUMENTS

| | | | |
|---|---|---|---|
| 3,527,121 A | * | 9/1970 | Moore ................ 475/338 |
| 3,842,481 A | | 10/1974 | Laing |
| 4,185,188 A | | 1/1980 | Sigl |
| 4,187,740 A | | 2/1980 | Silvestri |
| 4,674,360 A | * | 6/1987 | Matoba ................ 475/335 |
| 4,793,214 A | * | 12/1988 | Nurnberger et al. ........ 475/331 |
| 4,901,601 A | | 2/1990 | Leggat |
| 5,145,471 A | * | 9/1992 | Meier-Burkamp .......... 475/331 |
| 5,302,160 A | | 4/1994 | Fujioka |
| 5,827,147 A | * | 10/1998 | Stewart ................ 475/331 |
| 5,928,105 A | | 7/1999 | Taha et al. |
| 6,053,023 A | | 4/2000 | Landrum |
| 6,422,971 B1 | | 7/2002 | Katou et al. |
| 6,508,140 B2 | | 1/2003 | Zaps |
| 6,663,530 B2 | * | 12/2003 | Poulin et al. ............. 475/331 |
| 2001/0018381 A1 | | 8/2001 | Suzumura et al. |

FOREIGN PATENT DOCUMENTS

| | | | | |
|---|---|---|---|---|
| EP | 271416 A1 | * | 6/1988 | ........... F16H/57/08 |
| JP | 358 156 773 A | | 9/1983 | |
| JP | 02163547 A | * | 6/1990 | ........... F16H/01/28 |
| JP | 02180325 A | * | 7/1990 | ........... F16H/01/28 |

* cited by examiner

Primary Examiner—Tisha Lewis
(74) Attorney, Agent, or Firm—Fraser Martin Buchanan Miller LLC; Donald R. Fraser

(57) ABSTRACT

The method of producing a pinion carrier comprised of two cold form cooperating carrier components, each consisting of an aperture relatively flat plate having legs extending transversely from the plate; assembling the components so that the legs of one of the components abutted the legs of the other component, and welding the abutting legs together.

3 Claims, 1 Drawing Sheet

PINION CARRIER FOR PLANETARY GEAR TRAIN AND METHOD OF MAKING SAME

This application is a continuation of international application number PCT/US03/03921 filed Feb. 10, 2003.

Which application claims the benefit of U.S. Provisional Patent Application Ser. No. 60/362,106, filed Mar. 5, 2002.

BACKGROUND OF THE INVENTION

Field of the Invention

The present invention relates to torque transmission systems and more particularly to a pinion carrier for planetary gear set and method of making same.

Description of the Prior Art

Typical planetary gear sets contain a pinion carrier and a set of planetary gears. The pinion carrier determines the location of the gears and properly retains the gears in the desired location. There are many variations in the design of the pinion carriers. The design of the carrier is determined by the design of the set of gears and the process selected for manufacturing the carrier.

One-piece carriers are presently formed by machining the components from a solid metal work piece which is formed by casting or molding from materials such as powder metal or cast iron.

Due to the cost involved in producing one piece carriers, the vast majority of carriers are produced from multiple components. Each of the components is typically produced by one of the following methods: 1) stamping from sheet stock; 2) forging; 3) casting; and 4) powdered metal compaction and sintering.

Currently, gear set assemblies employing cold forged or stamped carriers consist of one flat plate and a pedestal comprised of a flat plate having a plurality of outwardly extending legs. The flat plate is positioned on the legs of the pedestal with the legs either abutting the plate, or with the legs protruding through the plate. The assemblage is then welded together. Such a design wherein the legs protrude integrally from only one part of the assembly requires a high degree of deformation in the work piece in the manufacturing process. The longer the legs tend to be, the more difficult it becomes to cold forge the component.

It is an object of the present invention to produce a pinion carrier, which is readily manufactured without any substantial deformation of any of the individual parts prior to final assemblage.

SUMMARY OF THE INVENTION

The above as well as other objects and advantages of the invention may be achieved by a pinion carrier comprised of a first annular body having an outer surface and an inner surface and a plurality of legs projecting from the circumference of the inner surface and terminating in a flat surface; a pinion gear carried on the inner surface of the body; a second annular body having an outer surface and an inner surface and a plurality of legs projecting from the circumference of the inner surface and terminating in a flat surface; and the flat surfaces of the legs of the first annular body being joined to the flat surface of the legs of the second annular body.

BRIEF DESCRIPTION OF THE DRAWINGS

The above objects and advantages of the invention will become readily apparent to those skilled in the art from reading the following detailed description of the invention when considered in the light of the accompanying drawings, in which.

DETAILED DESCRIPTION OF THE PREFERRED EMBODIMENT

Figure 1:
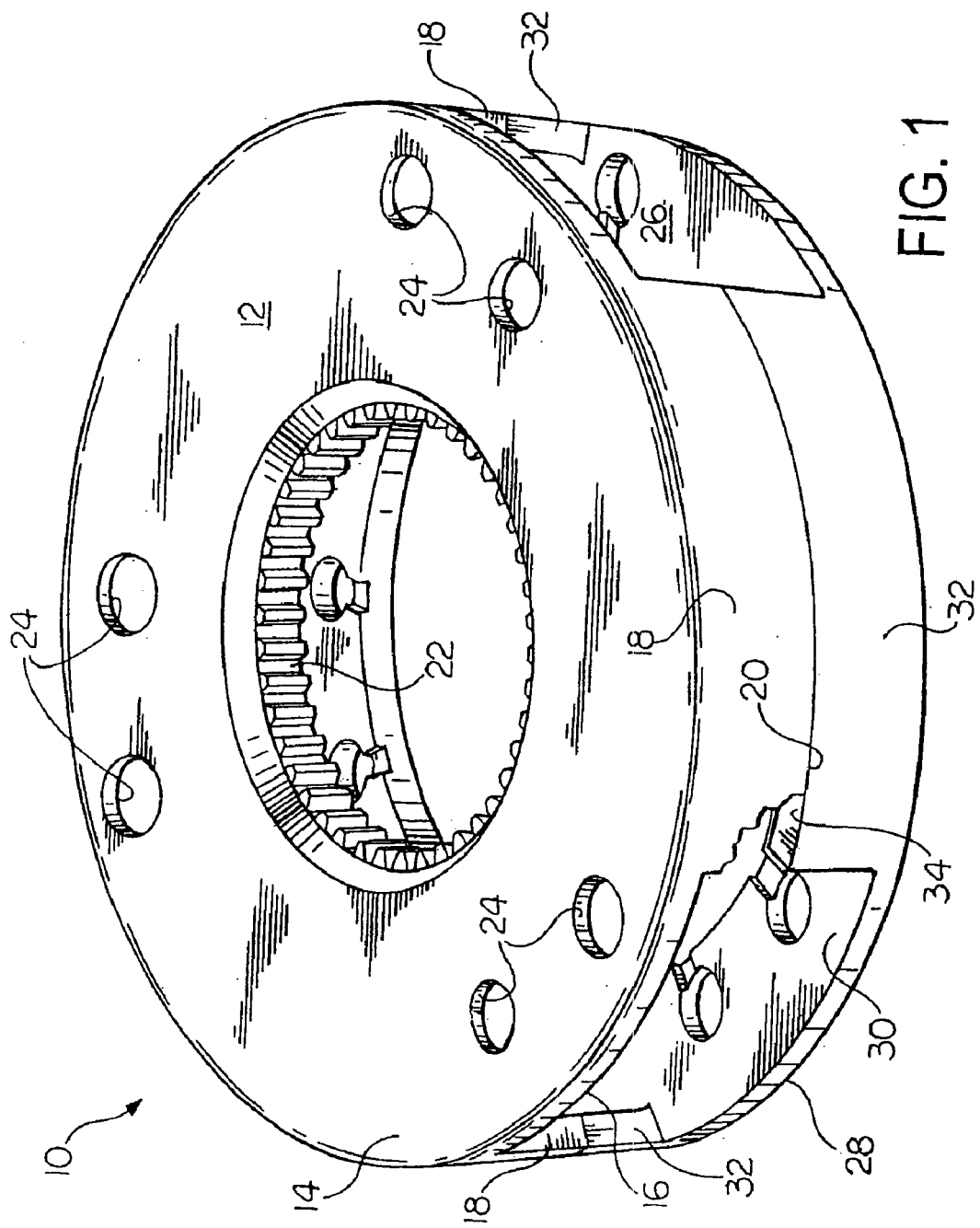
FIG. 1 is a perspective view of an embodiment of the invention which portions cut-away to more clearly illustrate the structure.

Referring to the drawings there is illustrated a pinion carrier incorporating features of the invention wherein the carrier is generally indicated by reference numeral 10.

The pinion carrier 10 includes a first annular body 12 having an outer surface 14 and an inner surface 16 and a plurality of legs 18 projecting downwardly from the circumference of the inner surface 16. Each of the legs 18 terminates in a flat surface 20.

There is further provided an internally splined member 22 integral with the annular body 12.

In the illustrated embodiment, three pairs of pinion gears having associated pinions shafts are carried by the completed pinion carrier 10. Suitable holes 24 are formed in the annular body 12 and are adapted to extend from the outer surface 14 to the inner surface 16 of the carrier. It will be understood that in other embodiments different members of gears may be utilized.

A second annular body 26 is provided having an outer surface 28 and an inner surface 30. A plurality of legs 32 are caused to project from the circumference of the inner surface 30. Each of the legs 32 terminates in a flat surface 34.

Each of the subcomponents of the structures described above is typically cold formed from a blank of formable metal stock generally annular in shape with a centrally formed aperture. The blanks are cold formed into cup-shaped components as illustrated. These components are then typically disposed such that the inner surfaces 16 and 30 of the annular bodies 12 and 26, respectively, are in facing relation with each other, as well as the flat surfaces 20 and 34 of the respective legs 18 and 32. It will be appreciated that the terminal surfaces of the legs 18 and 32 are caused to be placed in contacting relation and are integrally joined as by welding, for example. Welding techniques, such as laser welding, high frequency induction welding, capacitive discharge, MIG, or TIG, for example.

It will be further appreciated that the resulting pinion carrier 10 is assembled so that the legs or pedestals 18 and 32 are of substantially the same length through the utilization of legs on each of the mating components of the final assembly, the extrusion height each component is reduced from the overall total height, facilitating the cold forming process.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A pinion carrier for a planetary gear assembly comprising:
   a first cold formed cup-shaped body having an outer surface, an inner surface, and a circumferential side wall with a longitudinal central axis and including a plurality of spaced-apart legs terminating in flat surfaces; and
   a second cold formed cup-shaped body having an outer surface, an inner surface, and a circumferential side wall with a longitudinal central axis and including a plurality of spaced-apart legs terminating in flat surfaces;
   wherein at least one of said cup-shaped bodies is provided with a centrally formed aperture and including a torque transfer structure circumscribing the aperture and the flat surfaces of the legs of said first and second bodies are in juxtaposed contacting relation and suitably welded together.

2. A pinion carrier as defined in claim 1 wherein said first cup-shaped body and said second cup-shaped body are provided with holes for receiving shafts of associated pinions.

3. A pinion carrier as defined in claim 2 wherein the holes for the pinions are located intermediate said spaced-apart legs.

* * * * *